(12) United States Patent
Martin

(10) Patent No.: US 6,808,194 B2
(45) Date of Patent: Oct. 26, 2004

(54) PIVOT LINKAGE FOR TRUCK RECOVERY UNIT

(76) Inventor: Floyd G. Martin, 1241 Long La. Road, East Earl, PA (US) 17517

( * ) Notice: Subject to any disclaimer, the term of this patent is extended or adjusted under 35 U.S.C. 154(b) by 104 days.

(21) Appl. No.: 10/236,247

(22) Filed: Sep. 6, 2002

(65) Prior Publication Data

US 2003/0215317 A1 Nov. 20, 2003

Related U.S. Application Data

(60) Provisional application No. 60/381,357, filed on May 17, 2002.

(51) Int. Cl.[7] .............................................. B62D 53/04
(52) U.S. Cl. ......................... 280/402; 414/493; 414/563
(58) Field of Search ................................ 280/401, 402, 280/407.1, 418.1, 415.1, 441.1, 491.1, 493, 498; 414/563

(56) References Cited

U.S. PATENT DOCUMENTS

| | | | |
|---|---|---|---|
| 4,838,753 A | * | 6/1989 | Gehman et al. ............ 414/563 |
| 5,722,677 A | | 3/1998 | Lichter |
| 5,845,920 A | | 12/1998 | Hill |
| 5,853,283 A | * | 12/1998 | Grant .......................... 414/563 |
| 5,863,059 A | | 1/1999 | Waggoner |
| 5,988,664 A | | 11/1999 | Hill |
| 6,095,748 A | * | 8/2000 | Zackovich ................... 414/563 |
| 6,120,051 A | | 9/2000 | Lichter |

* cited by examiner

Primary Examiner—Khoi H. Tran
(74) Attorney, Agent, or Firm—Miller Law Group, PLLC

(57) ABSTRACT

A disabled truck recovery unit is detachably mountable on the back of a standard truck tractor to permit the standard truck tractor to be operable to tow a disabled truck tractor over the highway in a safe and effective manner. The disabled truck recovery unit includes an anchoring frame assembly connected to the standard truck tractor and an attaching frame assembly that can be connected to a disabled truck tractor to permit the towing thereof. The two frame assemblies are pivotally connected and powered by a single hydraulic actuator to convert the frame mechanism from a compact transport configuration to an operative position to engage the disabled truck tractor. A scissors linkage mechanism interconnects the hydraulic cylinder and the frame assemblies to effect proper movement thereof. An engine is mounted on the anchoring frame assembly to provide an independent source of operative power for the hydraulic cylinder.

19 Claims, 5 Drawing Sheets

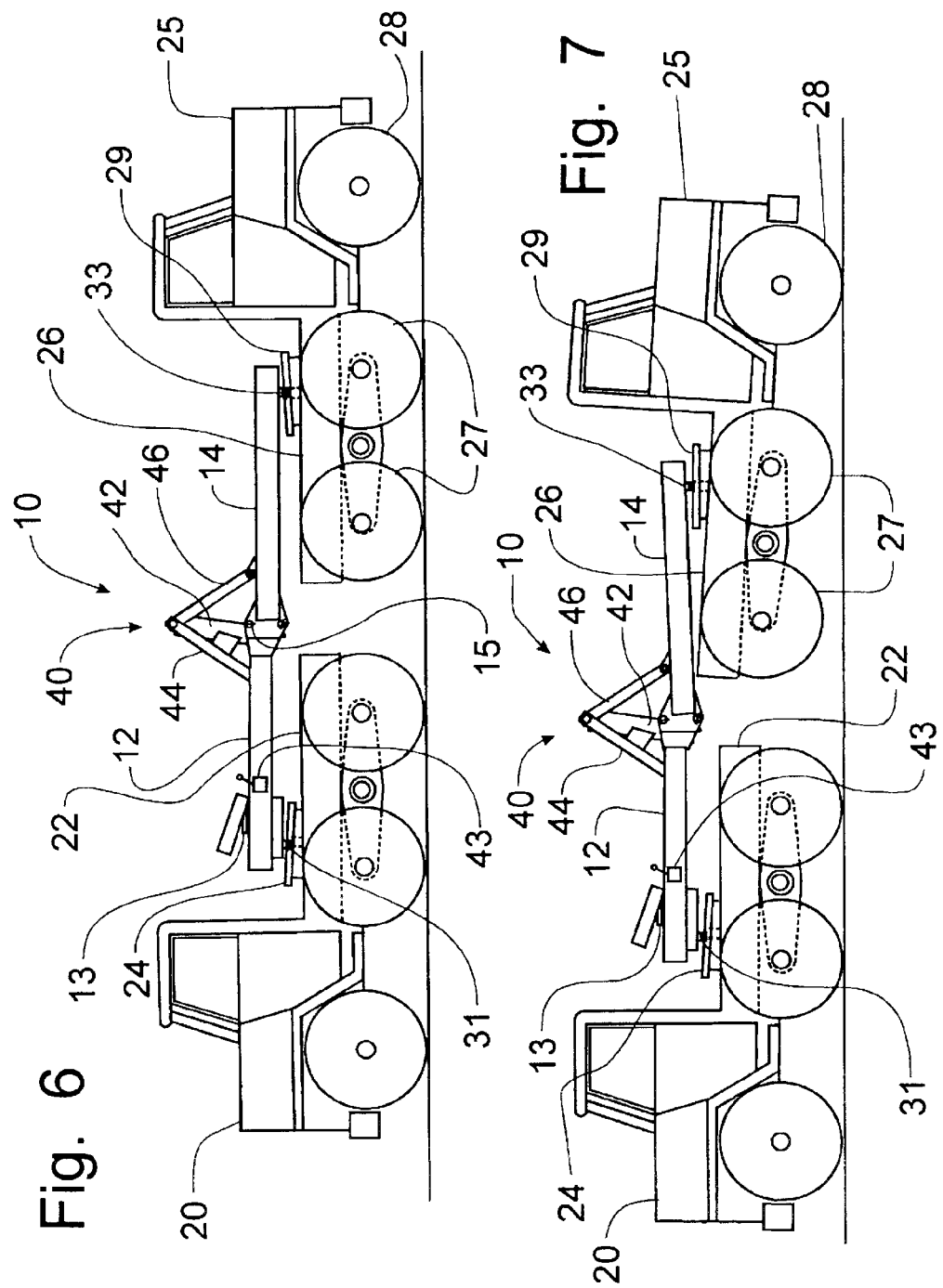

PIVOT LINKAGE FOR TRUCK RECOVERY UNIT

CROSS-REFERENCE TO RELATED APPLICATIONS

This application claims domestic priority on U.S. Provisional Patent Application Ser. No. 60/381,357, filed May 17, 2002, the contents of which are incorporated herein by reference.

BACKGROUND OF THE INVENTION

The present invention relates generally to transporting disabled vehicles and, more particularly, to a recovery unit for hitching a disabled truck tractor to a towing truck tractor.

Due to intense usage of truck tractor and trailer rigs in transporting the bulk of goods and freight over the nation's highways, it is to be expected that tractor breakdown will be a frequent occurrence. Typically, a disabled tractor has to be removed from the highway to a service facility in order for repairs to be made. Removal normally requires towing the disabled tractor by using a large tow truck specially equipped and dedicated for that purpose. However, such tow trucks are expensive and so in many areas of the country there are either none available or there will usually be considerable delay in obtaining the services of one when a breakdown occurs.

Over the years, several attempts have been made to temporarily adapt an ordinary truck tractor to perform such towing tasks in addition to its normal use as part of a tractor and trailer rig. The objective is to eliminate the need to locate a dedicated tow truck in order to remove a disabled tractor from the highway to a service facility. The advantage in being able to use another tractor is that such tractors are found with much greater frequency in all parts of the country than are dedicated tow trucks and thus one would surely be quickly and conveniently available about anywhere the need might arise. Representative of the hoist and towing mechanisms devised in the prior art for this purpose is the recovery unit shown and described in U.S. Pat. No. 4,708,358 (Gehman). Specialized tow trucks for retrieving disabled truck tractors are limited in turning capability when towing a disabled truck tractor. The recovery unit as shown and described in U.S. Pat. No. 4,708,358 simulates a trailer in that the articulated frame locked into the operative position turns like a truck trailer about the pivotal connection between the recovery unit and the fifth wheel of the towing truck.

This recovery unit of U.S. Pat. No. 4,708,358 utilizes at least three hydraulic cylinders coupled to two control valves to effect an unfolding and operative connection to a disabled truck tractor. A major problem in operating the recovery unit constructed as described in U.S. Pat. No. 4,708,358 is the coordination required between the operation of the two control valves operating the respective hydraulic cylinders. Improper coordination would result in the recovery unit binding due to the respective hydraulic cylinders urging pivotal movement about two or more axes. U.S. Pat. Nos. 5,988,664 and 5,845,920, issued to Hill teach that the recovery apparatus can be operated through the use of a single hydraulic cylinder; however, the frame mechanism cannot be compactly folded when being transported from one job site to another. These mechanisms take advantage of the fifth wheel on the towing tractor to convert it for towing a disabled tractor instead of a trailer.

It would be desirable to provide a disabled truck recovery unit that can be utilized with a standard truck tractor to tow a disabled truck tractor over the highway in a safe and effective manner using a single hydraulic actuator to convert the frame mechanism from a compact transport configuration to an operative position to engage the disabled truck tractor.

SUMMARY OF THE INVENTION

It is an object of this invention to overcome the disadvantages of the prior art by providing a disabled truck recovery unit utilizing a single hydraulic cylinder to operate the unit.

It is a feature of this invention that the disabled truck recovery unit incorporates a single hydraulic cylinder cooperable with linkage to convert the frame mechanism from a compact transport configuration to an operative configuration.

It is an advantage of this invention that the construction of the disabled truck recovery unit can be accomplished at less cost than has been previously known.

It is another object of this invention to configure a single hydraulic cylinder and associated linkage to provide the operation formerly accomplished by a truck recovery unit having three hydraulic cylinders.

It is another feature of this invention that the disabled truck recovery unit can be transported in a compact configuration.

It is another advantage of this invention that the hydraulic operation of the disabled truck recovery unit can be effected through manipulation of a single hydraulic control lever.

It is still another advantage of this invention that the disabled truck recovery unit can be constructed with fewer moving parts than has heretofore been known in the art.

It is still another feature of this invention that coordination between multiple hydraulic control valves to effect proper operation of a disabled truck recovery unit has been eliminated through the utilization of a single hydraulic control valve to effect operation of the unit.

It is still another object of this invention to provide a power unit as an integral part of the disabled truck recovery unit to provide operative power for the hydraulic cylinder effecting pivotal movement of the frame to operate the unit.

It is still another feature of this invention that the power unit can be in the form of an electric motor, a gasoline engine, or a diesel engine.

These and other objects, features and advantages are accomplished according to the instant invention by providing a disabled truck recovery unit that is mountable on the back of a standard truck tractor to permit the standard truck tractor to be operable to tow a disabled truck tractor over the highway in a safe and effective manner. The disabled truck recovery unit includes an anchoring frame assembly connected to the standard truck tractor and an attaching frame assembly that can be connected to a disabled truck tractor to permit the towing thereof. The two frame assemblies are pivotally connected and powered by a single hydraulic actuator to convert the frame mechanism from a compact transport configuration to an operative position to engage the disabled truck tractor. A linkage apparatus interconnects the hydraulic cylinder and the frame assemblies to effect proper movement thereof. An engine is mounted on the anchoring frame assembly to provide an independent source of operative power for the hydraulic cylinder.

BRIEF DESCRIPTION OF THE DRAWINGS

The advantages of this invention will be apparent upon consideration of the following detailed disclosure of the invention, especially when taken in conjunction with the accompanying drawings wherein:

FIG. 6 is a schematic representation of the disabled truck recovery unit disposed on a truck tractor and unfolded into the operative position and engaged with a disabled truck; and FIG. 7 is a schematic representation of the disabled truck recovery unit in the full operative position with the rear drive wheels of the disabled truck tractor raised for transport over the highway.

DETAILED DESCRIPTION OF THE PREFERRED EMBODIMENT

Figure 1:
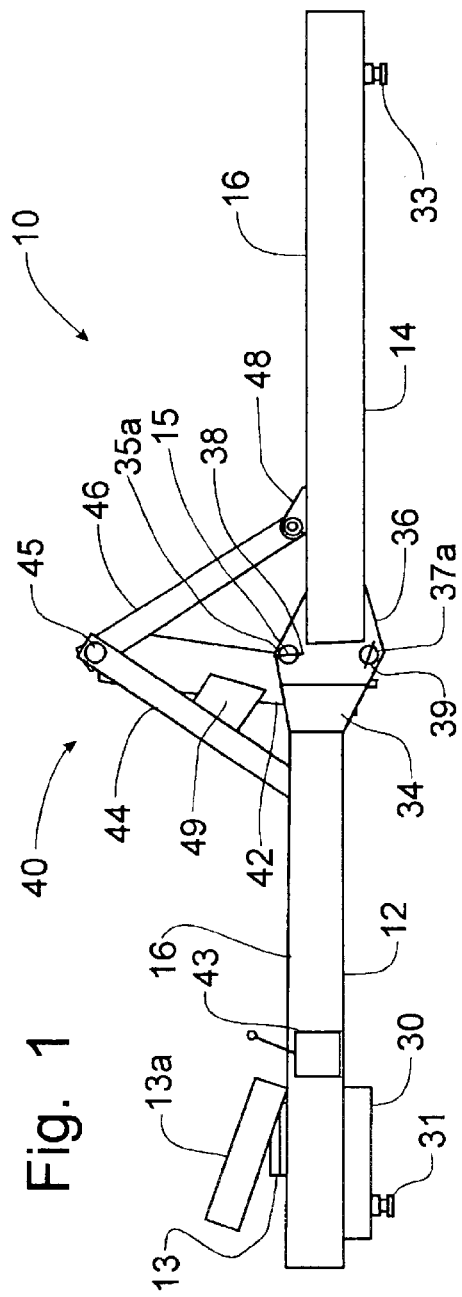
FIG. 1 is an elevational view of the disabled truck recovery unit unfolded into the operative configuration for engagement with a disabled truck tractor.
Figure 2:
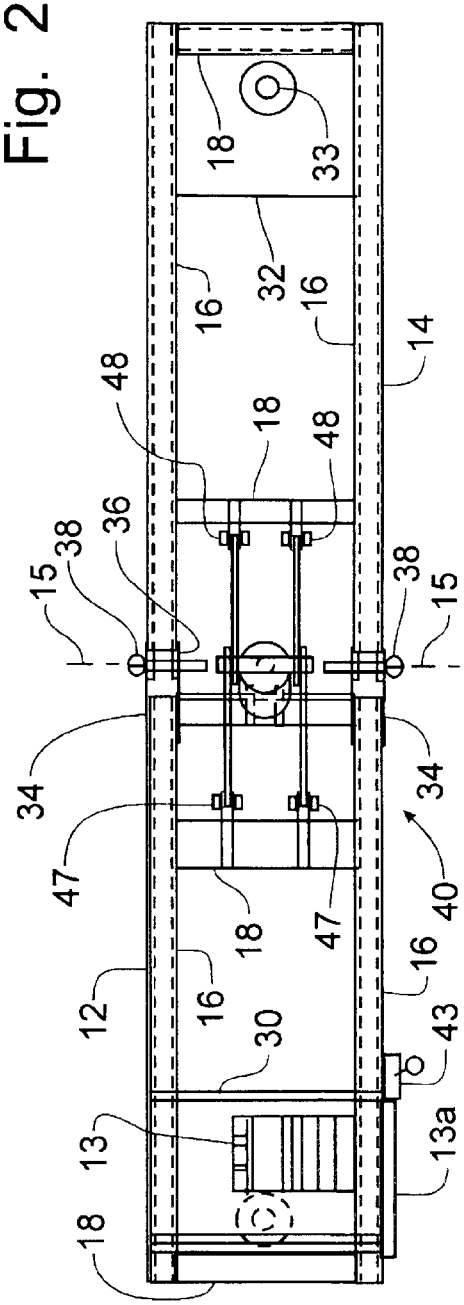
FIG. 2 is a top plan view of the disabled truck recovery unit shown in FIG. 1.

Referring now to FIGS. 1–5, a disabled truck recovery unit 10 incorporating the principles of the instant invention can be seen. This disabled truck recovery unit 10 is similar to the embodiment depicted in U.S. Pat. No. 4,708,358 granted to Roland P. Gehman, et al, on Nov. 24, 1987. The descriptive portions of U.S. Pat. No. 4,708,358 are incorporated herein by reference. This disabled truck recovery unit 10 improves on the device shown and described in U.S. Pat. No. 4,708,358 (Gehman) in that only a single hydraulic cylinder 42 and control valve 43 are required to operate the disabled truck recovery unit 10, as will be described in greater detail below. Any references herein to such terms as "forward", "rearward", "left", "right", "upwardly", "downwardly", and the like are words of convenience and are not to be construed as limiting terms. Such terms are to be determined by standing at the rear of the towing truck tractor 20, on which the recovery unit 10 would be mounted, and facing toward the towing truck tractor 20 into the normal direction of travel.

The disabled truck recovery unit 10 is primarily formed with an anchoring frame assembly 12 and an attaching frame assembly 14 composed of respective longitudinal beams 16 and cross beams 18 rigidly interconnected to form rectangular-shaped open structures, with the attaching frame assembly 14 preferably being slightly longer than the anchoring frame assembly 12. As depicted in U.S. Pat. No. 4,708,358, support legs (not shown) and arms (not shown) can be utilized to support the disabled truck recovery unit in a free-standing condition on the ground under which an appropriate truck tractor can back underneath the disabled truck recovery unit to permit a detachable mounting thereon. Once the disabled truck recovery unit 10 has been mounted on the towing truck 20, the support legs and arms are released and removed from the anchoring frame assembly 12. Alternatively, the recovery unit 10 can be lifted into place by a fork lift (not shown) or other lifting device to be mounted on the towing truck 20.

The anchoring frame assembly 12 has a plate 30 mounting a downwardly extending king pin 31 and being attached across its longitudinal beams 16 at the front portion of the anchoring frame assembly 12. Similarly, the attaching frame assembly 14 has a plate 32 mounting a downwardly extending king pin 33 and being attached between a pair of the cross beams 18 at the rear portion thereof. The king pin 31 of the anchoring frame assembly 12 adapts it to be coupled to a fifth wheel 24 of the towing tractor 20, whereas the king pin 33 of the attaching assembly frame 14 adapts it to be coupled to a fifth wheel 29 of a disabled tractor 25 (as seen in FIGS. 6–7) to be towed using the recovery unit 10.

Also, the anchoring frame assembly 12 has pivot plates 34 mounted at the rearward end of the anchoring frame assembly 12 in which are formed upper and lower pivotal mounting holes 35, 35a. The pivot plates 34 are attached to the anchoring frame assembly 12 at opposite sides of the rear portion thereof. Further, the attaching frame assembly 14 is provided with pivot plates 36 defining upper and lower complementary pivotal mounting holes 37, 37a. The pivot plates 36 are attached to the attaching frame assembly 14 at opposite sides of the forward portion thereof to register with the pivot plates 34 on the anchoring frame assembly 12. The pivot plates 36 of the attaching frame assembly 14 are pivotally mounted on the pivot plates 34 of the anchoring frame assembly 12 by pins 38 positioned through the corresponding upper holes 35, 37 to define a pivot axis 15 about which the attaching frame assembly 14 pivotally moves relative to the anchoring frame assembly 12.

Figure 3:
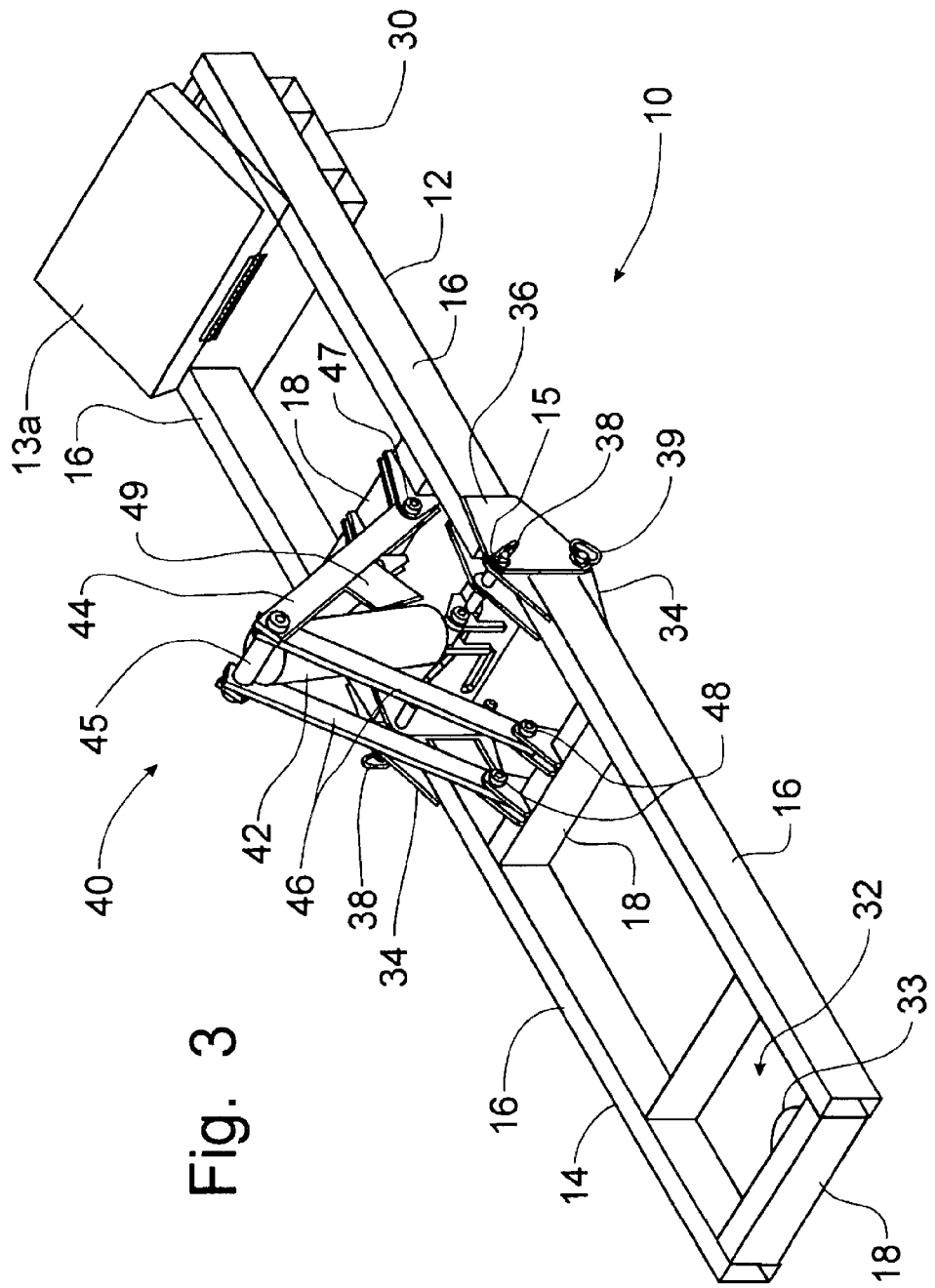
FIG. 3 is a perspective view of the disabled truck recovery unit shown in FIGS. 1 and 2.
Figure 5:
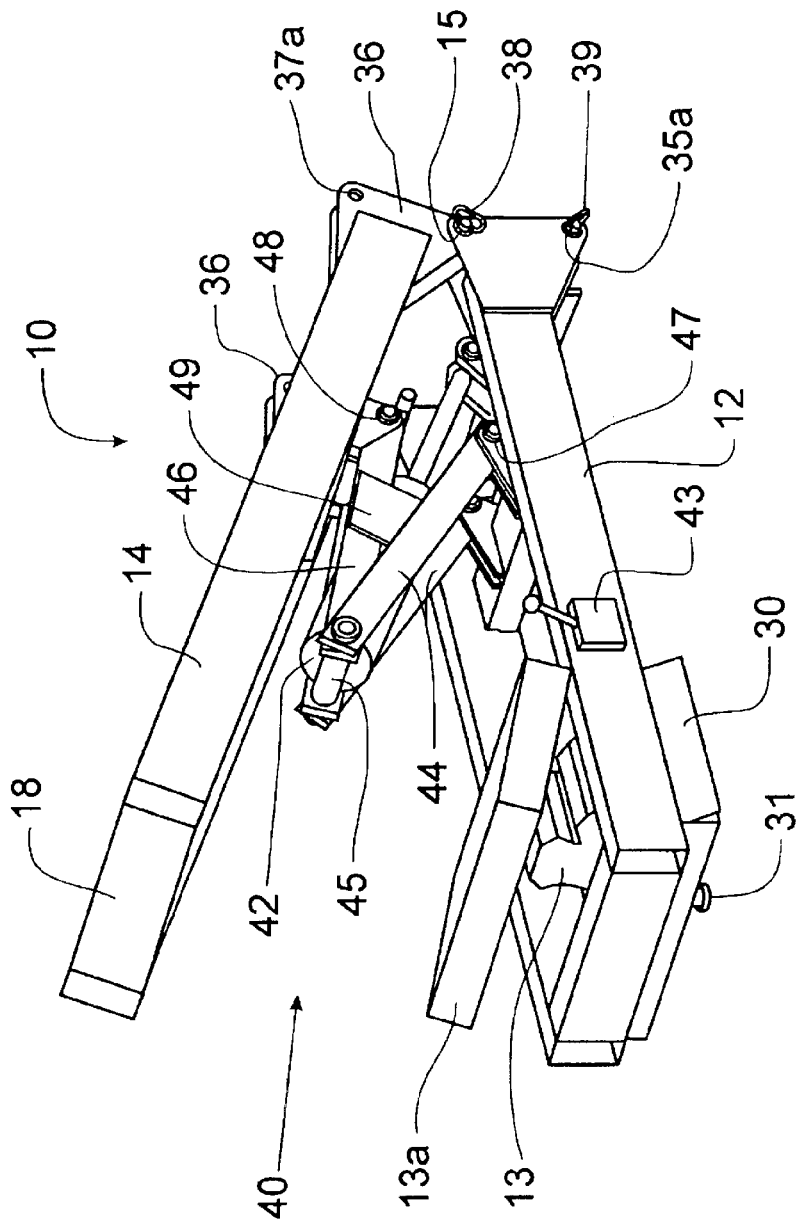
FIG. 5 is a perspective view of the disabled truck recovery unit folded into a position very close to the transport configuration.

Such pivotal connection allows pivotal movement of the attaching frame assembly 14 between its stored and extended conditions relative to the anchoring frame assembly 12, as seen respectively in FIGS. 3 and 5. When the attaching frame assembly 14 is pivoted to its extended condition, and more specifically to an operative position seen in FIG. 7, relative to the anchoring frame assembly 12, pins 39 can be extended through the lower ones of their aligned complementary mounting holes 35a, 37a to rigidly lock the anchoring and attaching frame assemblies 12, 14 in fixed relation so as to form a solid towing beam which will interconnect the fifth wheels 24, 29 of the tractors 20, 25. It will be noticed that when the attaching frame assembly 14 is at its transport or stored configuration, wherein the attaching frame assembly 14 overlies the anchoring frame assembly 12, the attaching frame assembly 14 is incapable of being coupled to the disabled tractor fifth wheel 29, whereas when the attaching frame assembly 14 is at its extended position, in which the attaching frame assembly 14 forms a rearward extension of the anchoring frame assembly 14, the attaching frame assembly 14 is capable of being aligned with and coupled to the fifth wheel 29.

Another basic component of the recovery unit 10 is an actuating mechanism. The actuating mechanism is formed by the hydraulic cylinder 42 and the actuation linkage mechanism 40 and is selectively operable to move the attaching frame assembly 14 relative to the anchoring frame assembly 12 between the stored or transport and extended or operative positions. Also, once the attaching frame assembly 14 has been moved to its extended condition and coupled to the fifth wheel 29 of the disabled tractor 25 the actuating mechanism is selectively operable to move the attaching frame assembly 14 to and from the towing position relative to the anchoring frame assembly 12 so as to place the frame 26 of the disabled tractor 25 in a raised towing position.

The hydraulic cylinder 42 can be powered from a hydraulic system onboard the towing truck 20, but is preferably supplied by a power unit such as the engine 13 that is mounted directly on the anchoring frame assembly 12 of the recovery unit 10 beneath the hinged engine cover 13a, which is depicted in the drawings in an elevated position to best depict the engine. Under normal conditions, the engine cover 13a is lowered to cover the engine 13. A five and a half horsepower engine has been found to be sufficient to power the operation of the hydraulic cylinder 42. Alternatively, the hydraulic system can be powered electrically from the towing truck 20. Hydraulic hoses running between the hydraulic cylinder 42, the control valve 43 and the power source for pressurized hydraulic fluid have been removed from the drawings for purposes of clarity, though one skilled in the art will understand that such conventional devices would be required to power the operation of the hydraulic cylinder 42.

Unlike the actuating mechanism of U.S. Pat. No. 4,708, 358, the actuating mechanism of the instant disabled vehicle recovery unit 10 is formed of a single hydraulic cylinder 42 coupled to an actuation linkage 40. The actuation linkage 40 is formed with a pair of first links 44 extending from a pivot mechanism 45 to the anchoring frame assembly 12 and a pair of second links 46 interconnecting between said pivot mechanism 45 and the attaching frame assembly 14. The linkage 40 works as a scissors linkage in that the respective pairs of links 44, 46 pivot about the pivot mechanism 45 as actuated by the hydraulic cylinder 42 to effect pivotal movement of the attaching frame assembly 14 relative to the anchoring frame assembly 12, as will be described in greater detail below.

Figure 4:
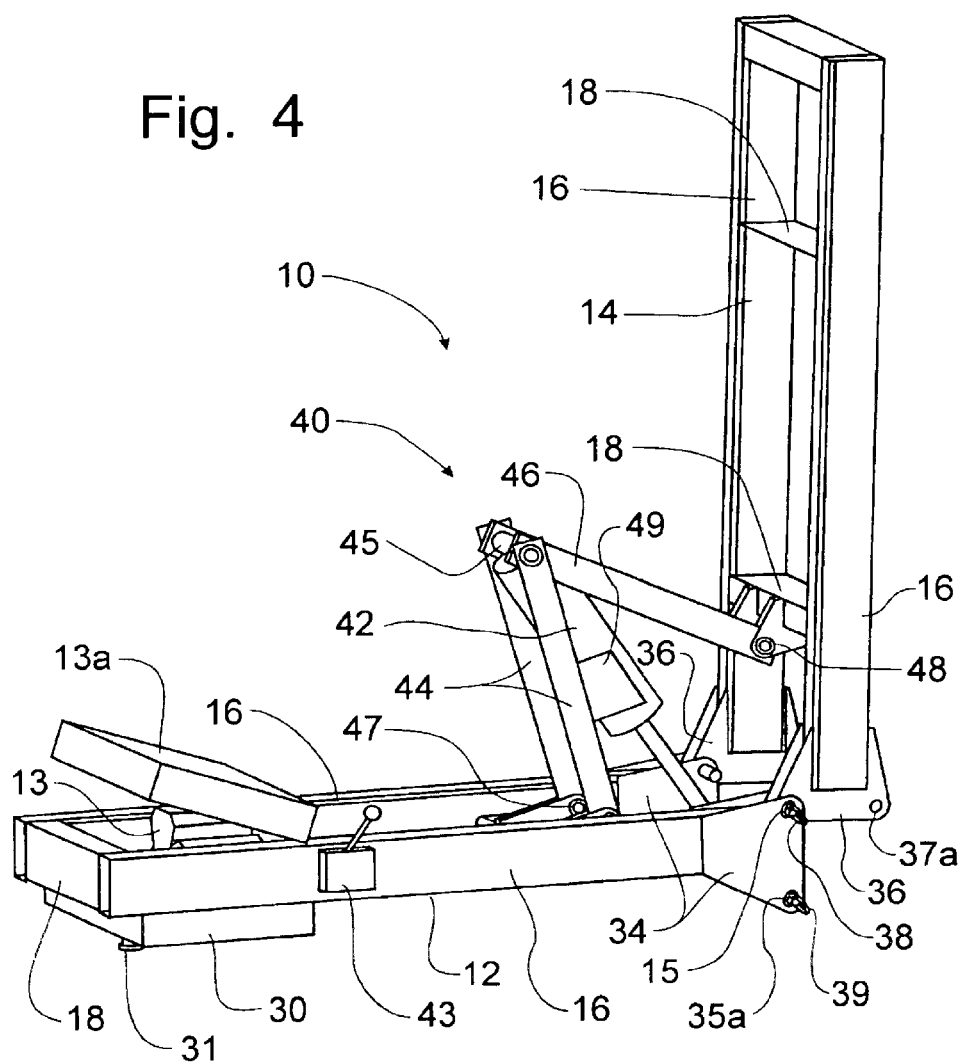
FIG. 4 is a perspective view of the disabled truck recovery unit at a mid-position between the transport configuration and the operative configuration.

The general sequence of the pivotal movement of the attaching frame assembly 14 can be seen in FIGS. 3–5. The actuation linkage 40 is collapsed, as depicted in FIG. 5, by the extension of the hydraulic cylinder 42 which serves to push the pivot mechanism 45 away from the pivotal connection at the pivot axis 15 between the anchoring frame assembly 12 and the attaching frame assembly 14. As one of ordinary skill in the art will recognize, the axis of the hydraulic cylinder 42 cannot pass over center with respect to the pivotal connections 47, 48 between the linkages 44, 46 and the respective frame assemblies 12, 14. Full extension of the hydraulic cylinder 42, however, will pull the attaching frame assembly 14 fairly close to the anchoring frame assembly 12 to form a compact transport configuration.

A stop plate 49 is provided on the linkage 44 to engage the opposing linkage 46 to prevent the actuation linkage 40 from folding over center with respect to the hydraulic cylinder 42. Beginning with the transport configuration similar to that depicted in FIG. 5, a manipulation of the control valve 43 for the hydraulic cylinder 42 to cause the hydraulic cylinder 42 to retract, causes the pivot mechanism 45 to be pulled toward the pivot axis 15 and, thereby, spread the actuation linkage 40. The spreading of the actuation linkage 40 causes the attaching frame assembly 14 to pivot about the pivotal connection thereof with the anchoring frame assembly 12 at the pivot axis 15 through a mid-point orientation as depicted in FIG. 4, to a fully opened, operative position as is depicted in FIG. 3. Such pivoting of the attaching frame assembly 14 will bring its king pin 33 near to the fifth wheel 29 of the disabled tractor 25.

The towing tractor 20 can then be backed toward the disabled tractor 25 to complete coupling of the king pin 33 to the fifth wheel 29, as seen in FIG. 6. At this point, the frame assemblies 12, 14 of the recovery unit 10 are resting on the respective frames 22, 26 of the truck tractors 20, 25. A chain (not shown) or another attaching mechanism (not shown) is then employed for attaching the frame 26 of the disabled, towed truck tractor 25 to the attaching frame assembly 14. This attaching mechanism (not shown) can be in the form of a pair of adjustable brackets (not shown) slidable along ledges (as is described in the aforementioned U.S. Pat. No. 4,708,358) on the longitudinal beams 16. Flexible chains (not shown) are connected to the brackets (not shown) which are used by the operator in a conventional manner to interconnect the brackets and the frame 26 of the disabled tractor 25.

After the attaching frame assembly 14 is coupled to the fifth wheel 29 of the disabled tractor 25 and the chains extended about the disabled tractor frame 26, the hydraulic cylinder 42 is then extended to move the actuation linkage 40 as described above and urge the attaching frame assembly 14 upwardly. This movement of the attaching frame assembly 14 with the fifth wheel 29 of the disabled towed truck tractor 25 attached thereto first try to lift the disabled truck tractor 25. Since the connection of the attaching frame assembly 14 to the towed truck tractor 25 is off center with respect to the center of gravity of the towed truck tractor 25, the resultant action is to cause a tipping of the truck tractor 25, and a corresponding raising of the rear wheels 27 of the towed truck off the surface of the ground, leaving the towed truck tractor 25 supported by the front wheels 28 and the attaching frame assembly 12, as is depicted in FIG. 7.

After reaching this operative towing position, pins 39 are then inserted by the operator into lower aligned holes 35a, 37a to lock the pivot plates 34, 36 of the respective frame assemblies 12, 14 together in this operative towing position to form the solid towing beam extending between and interconnecting the fifth wheels 24, 29 of the respective tractors 20, 25. Reversal of the above-described operations will result in detachment of the attaching frame assembly 14 of the recovery unit 10 from the disabled tractor 25 after arrival at the repair service facility. The fixing of the disabled truck 25 to the attaching frame 14, while leaving the anchoring frame 12 pivotally connected to the towing truck 20 through the connection of the king pin 31 and the fifth wheel 24 of the towing truck 20, allows the recovery unit 10 and attached disabled truck 25 to simulate a normal trailer. Accordingly, the towed disabled truck 25 can turn freely about the fifth wheel 24 of the towing truck 20.

After disconnection of the disabled truck tractor 25 from the attaching frame 14, the hydraulic cylinder 42 is extended to push the pivot mechanism 45 away from the pivot axis 15 and cause a pivotal movement of the pivot links 44, 46 in a scissors-like manner to draw the attaching frame assembly 14 toward the anchoring frame assembly 12 through a pivotal movement thereof about the pivot axis 15. A full extension of the hydraulic cylinder 42 will pivot the attaching frame assembly 14 into a compact transport configuration positioned over top of the anchoring frame assembly 12. Re-attachment of the support legs (not shown) and associated structure as described in U.S. Pat. No. 4,708,358 will permit the anchoring frame assembly 12 to be disconnected from the towing truck tractor 30 and stored in an elevated position at a remote location for subsequent utilization. Alternatively, a fork lift (not shown) can be utilized to lift the recovery unit off the towing truck 20 and placed into storage.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A disabled truck recovery unit mountable to a first truck to permit said first truck to detachably connect a second truck to permit said first truck to tow said second truck, comprising:

an anchoring frame assembly mountable on said first truck;

an attaching frame assembly pivotally connected to said anchoring frame assembly, said attaching frame assembly having a connecting mechanism affixed thereto for detachable connection to said second truck;

a pivot linkage apparatus interconnecting said anchoring frame assembly and said attaching frame assembly; and a single actuator operably connected to said linkage apparatus to effect pivotal operation of said pivot linkage to cause pivotal movement of said attaching frame assembly relative to said anchoring frame assembly, wherein said hydraulic cylinder is operable to pivotally move said attaching frame between a compact transport configuration positioned above and over the top of said anchoring frame and an operative configuration in which said attaching frame extends rearwardly of said anchoring frame for detachable connection to said second truck.

2. The disabled truck recovery unit of claim 1 wherein said single actuator is operable to pivotally move said attaching frame assembly between a compact transport configuration positioned above said anchoring frame assembly and an operative configuration in which said attaching frame assembly extends rearwardly of said anchoring frame assembly for connection to said second truck.

3. The disabled truck recovery unit of claim 2 wherein said actuator is a hydraulic cylinder.

4. The disabled truck recovery unit of claim 3 wherein a power unit is supported on said anchoring frame assembly to provide operative power for said hydraulic cylinder.

5. The disabled truck recovery unit of claim 4 wherein a single control valve is provided with said hydraulic cylinder to effect operation thereof.

6. The disabled truck recovery unit of claim 5 wherein said anchoring frame assembly includes a mount and wherein said linkage apparatus includes:

a pivot member a pair of first links extending from said pivot member to said anchoring frame assembly; and a pair of second links extending from said pivot member to said attaching frame assembly, said hydraulic cylinder interconnecting said mount and said pivot member.

7. The disabled truck recovery unit of claim 6 wherein said hydraulic cylinder is oriented such that an extension thereof moves said pivot member away from said mount to pivot said attaching frame assembly toward said anchoring frame assembly.

8. The disabled truck recovery unit of claim 7 wherein said linkage apparatus further includes a stop member to prevent said linkage apparatus from becoming in an overcenter orientation when placed into said transport configuration.

9. In a disabled truck recovery unit mountable to a first truck to permit said first truck to detachably connect a second truck to permit said first truck to tow said second truck, said disabled truck recovery unit having an anchoring frame assembly mountable on said first truck; and an attaching frame assembly pivotally connected to said anchoring frame assembly, said attaching frame assembly having a connecting mechanism affixed thereto for detachable connection to said second truck, the improvement comprising:

a pivot linkage mechanism interconnecting said anchoring frame assembly and said attaching frame assembly; and a single actuator anchored on said anchoring frame and connected to said pivot linkage apparatus to effect pivotal action of said pivot linkage to cause pivotal movement of said attaching frame assembly relative to said anchoring frame assembly when actuated to permit said attaching frame assembly to move into a compact transport position above and over the top of said anchoring frame assembly.

10. The disabled truck recovery unit of claim 9 wherein said anchoring frame is provided with a mount, said linkage mechanism including:

a central pivot member;

a pair of first links extending from said pivot member to said anchoring frame assembly; and a pair of second links extending from said pivot member to said attaching frame assembly, said hydraulic cylinder interconnecting said mount and said pivot member.

11. The disabled truck recovery unit of claim 10 wherein said actuator is a hydraulic cylinder oriented such that an extension thereof moves said pivot member away from said mount to pivot said attaching frame assembly toward said anchoring frame assembly.

12. The disabled truck recovery unit of claim 11 wherein said linkage mechanism further includes a stop member to prevent said pivot linkage mechanism from becoming in an overcenter orientation when placed into said transport configuration.

13. The disabled truck recovery unit of claim 12 wherein a power unit is supported on said anchoring frame to provide operative power for said hydraulic cylinder.

14. The disabled truck recovery unit of claim 13 wherein a single control valve is provided with said hydraulic cylinder to effect operation thereof.

15. In a truck recovery unit mountable on a first truck to permit said first truck to detachably connect a second truck to permit said first truck to tow said second truck, said truck recovery unit having an anchoring frame detachably mountable on said first truck; and an attaching frame pivotally connected to said anchoring frame, said attaching frame having a connecting mechanism affixed thereto for detachable connection to said second truck, the improvement comprising:

a scissor linkage interconnecting said anchoring frame and said attaching frame, said scissor linkage including:

a central pivot member;

a pair of first links extending from said pivot member to said anchoring frame; and a pair of second links extending from said pivot member to said attaching frame; and a hydraulic cylinder anchored on on said anchoring frame and connected to said pivot member to cause movement of said pivot member, thus effecting pivotal movement of said attaching frame relative to said anchoring frame by pivoting said first and second links relative to each other, said pivotal movement at least causes said attaching frame to position above and over the top of said anchoring frame.

16. The truck recovery unit of claim 15 wherein said hydraulic cylinder is operable to pivotally move said attaching frame between a compact transport configuration positioned above said anchoring frame and an operative configuration in which said attaching frame extends rearwardly of said anchoring frame for detachable connection to said second truck.

17. The disabled truck recovery unit of claim 16 wherein a power unit is supported on said anchoring frame to provide operative power for said hydraulic cylinder.

18. The disabled truck recovery unit of claim 17 wherein a single control valve is provided with said hydraulic cylinder to effect operation thereof.

19. The disabled truck recovery unit of claim 18 wherein said scissors linkage further includes a stop member to prevent said scissors linkage from becoming in an overcenter orientation when placed into said transport configuration.

* * * * *